(12) United States Patent
Dupont et al.

(10) Patent No.: US 11,329,946 B2
(45) Date of Patent: May 10, 2022

(54) OPTIMIZATION OF THE REFRESH RATE OF A DNS REGISTRATION

(71) Applicant: Orange, Paris (FR)

(72) Inventors: Baptiste Dupont, Châtillon (FR); Emile Stephan, Châtillon (FR); Frédéric Fieau, Châtillon (FR); Mathilde Cayla, Châtillon (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 16/618,770

(22) PCT Filed: Jun. 4, 2018

(86) PCT No.: PCT/FR2018/000156
§ 371 (c)(1),
(2) Date: Dec. 2, 2019

(87) PCT Pub. No.: WO2018/229361
PCT Pub. Date: Dec. 20, 2018

(65) Prior Publication Data
US 2020/0137022 A1  Apr. 30, 2020

(30) Foreign Application Priority Data
Jun. 2, 2017 (FR) ........................... 1754932

(51) Int. Cl.
*H04L 29/12* (2006.01)
*H04L 12/841* (2013.01)
*H04L 29/06* (2006.01)
*H04L 61/4511* (2022.01)
*H04L 47/28* (2022.01)
*H04L 61/10* (2022.01)
*H04L 61/5007* (2022.01)

(52) U.S. Cl.
CPC ........ *H04L 61/1511* (2013.01); *H04L 47/286* (2013.01); *H04L 61/10* (2013.01); *H04L 61/2007* (2013.01); *H04L 63/108* (2013.01)

(58) Field of Classification Search
CPC combination set(s) only.
See application file for complete search history.

(56) References Cited

U.S. PATENT DOCUMENTS 10,069,788 B1 * 9/2018 Earl ..................... H04L 69/40
2005/0210150 A1 9/2005 Bahl
(Continued)

FOREIGN PATENT DOCUMENTS

WO  WO 2016/160977  10/2016

OTHER PUBLICATIONS

International Search Report and Written Opinion dated Aug. 21, 2018 for Application No. PCT/FR2018/000156.

*Primary Examiner* — El Hadji M Sall
(74) *Attorney, Agent, or Firm* — Knobbe, Martens, Olson & Bear, LLP

(57) ABSTRACT

A method is described for optimizing the refresh rate of at least one part of a registration, the registration including an association between a first identifier of a resource on a network and a second identifier of the resource, and a time to live for said association. The method is performed by a resolver server having obtained the registration from an authorization server. The method includes transmitting a message comprising at least the association to an application server referencing the first identifier.

10 Claims, 1 Drawing Sheet

(56) References Cited

U.S. PATENT DOCUMENTS

Figure 1:
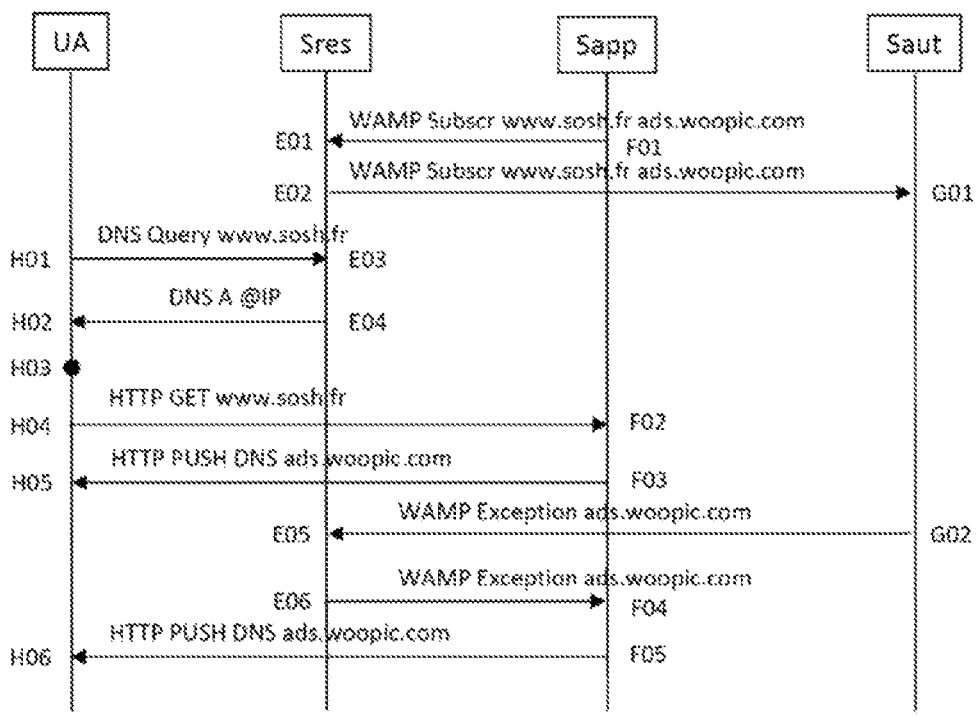

| | | | |
|---|---|---|---|
| 2009/0307602 A1* | 12/2009 | Brewer | G06Q 10/10 |
| | | | 715/744 |
| 2010/0118869 A1* | 5/2010 | Li | H04W 8/26 |
| | | | 370/389 |
| 2010/0274970 A1 | 10/2010 | Treuhaft | |
| 2012/0131096 A1* | 5/2012 | Bugenhagen | H04L 67/10 |
| | | | 709/203 |
| 2018/0097831 A1* | 4/2018 | Uppal | H04L 9/30 |

* cited by examiner

OPTIMIZATION OF THE REFRESH RATE OF A DNS REGISTRATION

RELATED APPLICATIONS

This application is the U.S. National Phase of Application No. PCT/FR2018/000156 entitled "OPTIMISATION OF THE REFRESH RATE OF A DNS REGISTRATION" and filed Jun. 4, 2018, which claims the benefit of French Patent Application No. 1754932, filed Jun. 2, 2017, each of which is incorporated by reference in its entirety.

1. FIELD OF THE INVENTION

The invention application lies in the field of naming and addressing on the internet, and more particularly in the field of the time-to-live of the associations between domain names and addresses, also called DNS (Domain Name System) records.

2. STATE OF THE ART

When a machine of a user (called User Agent), whether it be a fixed computer or a cellphone, accesses a single web page, for example using a web browser and the http protocol, it has to retrieve the IP addresses of a very large number of domain names. For each of these domain names, several DNS requests must therefore be transmitted to a server capable of returning to it a corresponding IP address. This server, called resolver server, is usually a server of the internet access provider of the user.

Depending on the nature of the domain name, that is to say whether it designates for example a website whose content changes little, or for example a video content in a cache server whose contents are by nature somewhat volatile, the duration of the validity of the association between the domain name and the address varies greatly. That is why a time-to-live is attached to a DNS record, referred to by the acronym TTL. A DNS record, including its TTL, is set by a so-called authoritative server, serving as reference for the resolver servers which consult it. The TTLs are set as short, so that the responses to DNS requests are not retained for too long, which would increase the risk of the IP address associated with a domain name and used by a server or a user machine being false at the time when it is used.

This means that a user machine must very frequently transmit DNS requests to a resolver server, even for domain names that are already known to the machine. This transmission frequency, combined with a trend toward an encrypted DNS, increases not only the overall traffic on the internet due to the DNS requests, but also the cost of the resolver servers, for their operators.

One of the aims of the invention is to remedy these drawbacks of the prior art.

3. SUMMARY OF THE INVENTION

The invention improves the situation using a method for optimizing the refresh rate of at least a part of a record comprising an association between a first identifier of a resource on a network and at least one second identifier of the resource, and a time-to-live for said association, the method being implemented by a resolver server having obtained said record from a so-called authoritative server (Saut), the method comprising:

a transmission of a message comprising at least said association, to an application server referencing the first identifier.

Generally, the first identifier is a domain name, and the second identifier is an address for finding on the network the resource to which the domain name points. Even though hereinbelow this case is retained in the explanations in the interests of simplification, the proposed method also covers the case where the second identifier is of the same type as the first, as for example in the case of DNS records of CNAME type, in which the second identifier is also a domain name, alias of the first identifier.

When a user machine accesses a content on an application server, for example an html page on a web server, and this content references an identifier of a resource on a network, for example the internet, but without address, such as a domain name without IP address, the user machine must transmit a so-called DNS request to a resolver server on which it depends, in order to obtain this address.

By transmitting, in advance, to the application server, the association between the identifier and the address, the resolver server allows the application server to provide, in its turn, said association to the user machine. Thus, the DNS request that this machine would have had to transmit to the resolver server is avoided.

According to one aspect, the optimization method also comprises:
   obtaining of an item of information relating to the life expectancy of the record,
   a modification of the record according to the item of information, prior to the transmission.

The benefit of the elimination of a DNS request to the resolver server may not be obtained if the address is not updated, or if the time-to-live of the association between elements of the record, also called TTL, is too short. Indeed, if the address is false because it has changed since the record was obtained by the resolver server, the user machine will transmit a request to obtain a content to a machine which no longer exists or which no longer has the requested content, and will have to transmit a DNS request to obtain a correct address after having tried to connect to the machine associated with the address obtained in response to the first request. And if the TTL is too short, the DNS record risks having expired and the user machine will have to transmit a DNS request at the moment when it needs the address.

Advantageously, by virtue of this aspect of the optimization method, the resolver server transmits to the application server a record (the association and its TTL) or a part of a record (the association only) after having modified it according to an item of information that it has obtained and which relates to its life expectancy. The life expectancy is all the greater when the association is exact, or when the time-to-live of the association is long.

According to one aspect of the optimization method, at least the time-to-live is modified.

The TTL is adjusted, for example extended, because of the stability of the association between the name and the address, confirmed by the resolver server.

According to one aspect of the optimization method, at least the second identifier is modified.

The resolver server receives a message from an authoritative server, or from a cache server, indicating to it, before the expiry of the time-to-live of the association between the domain name and the address, that the address has changed. This case is also known by the term "DNS exception". The TTL supplied in the message may also be modified, even though it may be preferable to wait, before doing that, for the stability of the association to be confirmed by the resolver server.

According to one aspect, the optimization method also comprises a reception of a request for subscription to updates of the record, from the application server.

Preventively, an application server can thus obtain a record that is as up to date as possible from a resolver server, concerning a domain name that it uses.

According to one aspect, the optimization method also comprises a prior transmission of a request for subscription to updates of the record, to the authoritative server.

Preventively, a resolver server can thus obtain a record that is as up to date as possible from an authoritative DNS server, which can be a network entity dividing up the content over several cache servers, that is to say from a server hosting associations between domain names and addresses, and for which the addresses change frequently. The subscription relates for example to a domain name for which an application server has previously subscribed to the resolver server.

According to one aspect of the optimization method, the at least one second identifier is the result of a selection of a subset from a set of second identifiers associated with the first identifier in the record obtained.

Thus, the resolver server can send to the application server a restricted number of associations for one and the same domain when several IP addresses are indicated in the DNS record received from the authoritative server. For example, it can remove the addresses having an effective time-to-live less than those of the others on the basis of measures taken by the resolver server. For example, if some addresses remain unchanged over successive updates of a record, the other addresses can be removed by the resolver server, which can also, optionally, increase the TTL of the modified record because it now contains only stable addresses.

The resolver server can also indicate, for one of the selected addresses, that it is the "default" address, or the address to be used as a priority.

The different aspects of the optimization method which have just been described can be implemented independently of one another or in combination with one another.

The invention relates also to a device for optimizing the refresh rate of at least a part of a record comprising an association between a first identifier of a resource on a network and at least one second identifier of the resource, and a time-to-live for said association, the device being included in a resolver server having obtained said record from a so-called authoritative server, the device comprising:
  a transmitter capable of transmitting a message comprising at least said association, to an application server referencing the first identifier.

This device, capable of implementing, in all its embodiments, the optimization method which has just been described, is intended to be included in a resolver server.

The invention relates also to a resolver server capable of receiving and of transmitting an identifier resolution request for a resource on a network, and comprising an optimization device conforming to what has just been described.

The invention relates also to a system for optimizing the refresh rate of at least a part of a record comprising an association between a first identifier of a resource on a network and at least second identifier of the resource, and a time-to-live for said association, the system comprising:
  a resolver server conforming to what has just been described,
  an application server referencing the first identifier included in the record, receiving from the resolver server a message comprising at least said association, and transmitting the at least one second identifier to a user terminal capable of transmitting an identifier resolution request for a resource on a network to the resolver server.

By virtue of this optimization system, the user terminal, although capable of transmitting a resolution request for a domain name to the resolver server on which it depends through its link with its internet access provider for example, no longer transmits the resolution request for domain names for which it has received an address through the application server by virtue of the optimization method described above. This reduces the number of resolution requests transmitted by the user terminal to the resolver server, and lightens the load of the resolver terminal.

The invention relates also to a computer program comprising instructions for implementing the steps of the optimization method which has just been described, when this program is executed by a processor.

The invention also targets an information medium that can be read by a resolver server, and comprising instructions of a computer program as mentioned above.

This program can use any programming language, and be in the form of source code, object code, or of intermediate code between source code and object code, such as in a partially compiled form, or in any other desirable form.

The information medium can be any entity or device capable of storing the program. For example, a medium can comprise a storage means, such as a ROM, for example a CD ROM or a microelectronic circuit ROM, or even a magnetic storage means, for example a diskette (floppy disk) or a hard disk.

Also, an information medium can be a transmissible medium such as an electrical or optical signal, which can be routed via an electrical or optical cable, wirelessly or by other means. The program according to the invention can in particular be downloaded over a network of Internet type.

Alternatively, an information medium can be an integrated circuit in which a program is incorporated, the circuit being adapted to execute or to be used in the execution of the methods concerned.

4. DESCRIPTION OF THE FIGURES

Figure 2:
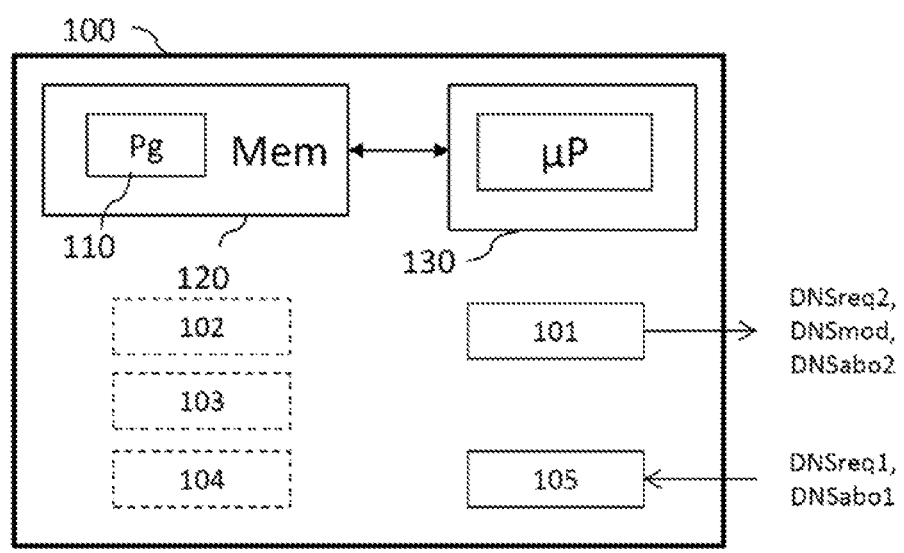

Other advantages and features of the invention will become more clearly apparent on reading the following description of a particular embodiment of the invention, given by way of simple illustrative and nonlimiting example, and the attached drawings, in which:

FIG. 1 presents an example of implementation of the method for optimizing the refresh rate of a DNS record, according to a few embodiments of the invention, FIG. 2 presents an example of a structure of a device for optimizing the refresh rate of a DNS record, according to an aspect of the invention.

5. DETAILED DESCRIPTION OF AT LEAST ONE EMBODIMENT OF THE INVENTION

Hereinafter in the description, examples of several embodiments of the invention are presented based on DNS records of type A or AAAA, that is to say in which the first identifier is a domain name and the second identifier is an IPv4 or IPv6 address, but the invention applies equally to all the other types. In the case of a DNS record of CNAME type for example, the second identifier of the resource is not an address per se but an alias of the domain name of the record. In the case of a DNS record of TKEY type for example, the second identifier of the resource is a digital key.

FIG. 1 presents an example of implementation of the method for optimizing the refresh rate of a DNS record, according to a few embodiments of the invention.

In this figure UA designates a user machine or terminal, also called user agent. For simplicity, the term "terminal" is used hereinafter in the document, bearing in mind that it can designate an "agent" such as a web browser for example, executed in or by the terminal.

Sres designates a resolver server assigned to the terminal UA to resolve its DNS requests.

Sapp designates an application server hosting a content to which the terminal UA must access, this content being able to include references to resources or contents hosted by other servers. The application server Sapp can be, for example, a web server.

Saut designates an authoritative server for the DNS requests that the resolver server Sres receives and that it cannot resolve itself.

In a step H01, the terminal UA wants to access the site www.sosh.fr, and the DNS cache of the terminal US does not already contain a record for the domain name "www.sosh.fr". The terminal UA therefore transmits a DNS request to the resolver server Sres. The resolver server Sres is for example a DNS server of the internet access provider of the user of the terminal UA.

In a step E03, the resolver server Sres receives the DNS request for the domain name "www.sosh.fr", and if it does not itself have an entry for this domain name in its DNS cache, the resolver server Sres transmits a request (not illustrated) to the authoritative server Saut to obtain it.

In a step E04, the resolver server Sres transmits to the terminal UA the response to the DNS request, comprising the IP address corresponding to the domain name "www.sosh.fr", and which is the IP address of the application server Sapp.

In a step H03, the terminal UA updates its DNS cache with the DNS record of the site www.sosh.fr.

In a step H04, the terminal UA opens an HTTPS connection with the application server Sapp, the web server of the site www.sosh.fr, by transmitting, for example, an "HTTPS GET www.sosh.fr" request. The terminal UA, that is to say its browser, and the application server Sapp can at this moment mutually indicate to one another the support of the "DNS over https" multiplexing.

In a step F02, the application server Sapp receives the HTTPS request. It responds in a step F03 with the data of the site www.sosh.fr. In addition, the application server Sapp sends, in advance, in the HTTPS connection, the DNS record of the domain "ads.woopic.com", because it is referenced on the site www.sosh.fr. It is assumed that the application server Sapp has this DNS record in its DNS cache.

In a step H05, the terminal UA receives the data of the site www.sosh.fr and the DNS record of the domain "ads.woopic.com", in the HTTPS connection. Since this domain is present in links on a page of the site www.sosh.fr, the terminal UA will not need to transmit a DNS request to the resolver server Sres to access the content hosted by the site ads.woopic.com.

For its part, the resolver server Sres detects that the DNS record of the domain "ads.woopic.com" has changed. It can do so according to at least two modes.

According to a first mode, in a step E05, the resolver server Sres is notified of this change by the authoritative server Saut, because the resolver server Sres has previously subscribed to the authoritative server Saut, in a step E02. This subscription request, received by the authoritative server Saut in a step G01, is for example a "Subscr ads.woopic.com" message using, for example, the WAMP protocol conveyed by the web socket protocol, which is itself conveyed over HTTP1. Prior to the step E02, the resolver server Sres may have received, in a step E01, a similar subscription request from the application server Sapp.

The message received by the resolver server Sres in the step E05 is transmitted by the authoritative server Saut in a step G02, in the form, for example, of an "Exception ads.woopic.com" message using, for example, the WAMP protocol as above.

According to a second mode that is not illustrated, the resolver server Sres confirms that the TTL of the DNS record of the domain "ads.woopic.com" is unsuitable either because it has remained unchanged for a period exceeding its TTL, in which case the resolver server Sres decides to increase its TTL, or because, on the contrary, it changes too rapidly with respect to its TTL, in which case the resolver server Sres decides to reduce it. Thus, the resolver server Sres avoids receiving pointless DNS requests concerning the domain "ads.woopic.com".

In one mode as in the other, the change of the DNS record of the domain "ads.woopic.com" is notified to the application server Sapp in a message transmitted by the resolver server Sres in a step E06, for example in the form of a "WAMP Exception ads.woopic.com" message.

The application server Sapp receives this message in a step F04, and, in a step F05, the application server Sapp transfers the message in the current HTTPS connection with the terminal UA.

In a step H06 similar to the step H05, the terminal UA receives the modified DNS record of the domain "ads.woopic.com" and can thus update its DNS cache and avoid pointlessly soliciting Sres with DNS requests.

In one mode as in the other, the resolver server Sres may have received, in a step E01, a request for subscription to changes of DNS record of the domain "ads.woopic.com", transmitted by the application server Sapp in a step F01. This subscription may be necessary to trigger a notification from the resolver server Sres to the application server Sapp, whether that be a DNS "exception", that is to say the correction of an IP address that is invalid or has become invalid (first mode), or a TTL adjustment (second mode).

In a third mode that is not illustrated, the resolver server Sres transmits to the application server Sapp the DNS record of the domain "ads.woopic.com" as soon as the application server Sapp has subscribed to it, and as soon as the resolver server Sres obtains this record. In this mode, the resolver server Sres does not wait for the DNS record to be modified to transmit it to the application server Sapp. That can be useful to the application server Sapp which does not necessarily have this record in its DNS cache, and, since the application server Sapp communicates it in its turn to the terminal UA, the resolver server Sres will not receive a pointless DNS request.

In this mode, the resolver server Sres can also choose to send to the application server Sapp only a part of the associations in a DNS record for a domain.

For example, if the DNS view of the resolver server Sres contains several "record A" for one and the same particular domain name, "ads.woopic.com" in our example:

"ads.woopic.com A 23.43.21.12",
"ads.woopic.com A 22.33.44.55",
"ads.woopic.com A 44.23.12.45",
the resolver server Sres can also send to the application server Sapp, for ads.woopic.com, a part of these "records A", for example the first two only.

It can also add to this list with, for example, an indication that the first "record A" of the list is a default server, or else change the order of the "records A".

In relation to FIG. 2, an example of structure of a device for optimizing the refresh rate of a DNS record is now presented, according to one aspect of the invention.

The routing information transmission device 100 implements the method for optimizing the refresh rate of a DNS record, of which different embodiments have just been described.

Such a device 100 can be implemented in a domain name resolution server, called resolver server, capable of receiving a request DNSreq1 to resolve a domain name on behalf of a user terminal, and of transmitting a corresponding request DNSreq2 to an authoritative server when it does not itself have the response to the request received.

For example, the device 100 comprises a processing unit 130, equipped for example with a microprocessor µP, and driven by a computer program 110, stored in a memory 120 and implementing the optimization method according to the invention. On initialization, the code instructions of the computer program 110 are for example loaded into a RAM memory, before being executed by the processor of the processing unit 130.

The device 100 also comprises:
a transmitter 101 which can, and is configured to, transmit a message DNSmod comprising at least said association, to an application server hosting a content comprising the domain name.

Advantageously, the processing unit 130 also can, and is configured to:
obtain (102) an item of information relating to the life expectancy of the record,
modify (103) the record according to the item of information, prior to its transmission,
select (104) a subset from a set of addresses associated with the domain name in the record obtained.

Advantageously, the device 100 also comprises:
a receiver 105 which can, and is configured to, receive a request DNSabo1 for subscription to updates of the record, from the application server.

Advantageously, the transmitter 101 also can, and is configured to:
transmit a request DNSabo2 for subscription to updates of the record, to the authoritative server.

This FIG. 2 illustrates only one particular way, out of several possible ways, of performing the algorithm detailed hereinabove, in relation to FIG. 1. Indeed, the technique of the invention is performed without preference on a reprogrammable computation machine (a PC computer, a DSP processor or a microcontroller) running a program comprising a sequence of instructions, or on a dedicated computation machine (for example a set of logic gates such as an FPGA or an ASIC, or any other hardware module).

In the case where the invention is installed on a reprogrammable computation machine, the corresponding program (that is to say the sequence of instructions) will be able to be stored in a removable storage medium (such as, for example, a diskette, a CD-ROM or a DVD-ROM) or a non-removable storage medium, this storage medium being partially or totally readable by a computer or a processor.

The invention claimed is:

1. A method for optimizing the refresh rate of at least a part of a DNS record comprising an association between a first identifier of a resource on a network and a second identifier of the resource, and a time-to-live for the association, the method implemented by a resolver server, the method comprising, in advance of an access to the record, by a terminal connected to an application server referencing the first identifier:
obtaining, from an authoritative server, the DNS record of the first identifier referenced by the application server; and
transmitting, to the application server, a message comprising a change of the DNS record of the first identifier referenced by the application server.

2. The method of claim 1, further comprising:
obtaining an item of information relating to the life expectancy of the DNS record; and
modifying the DNS record according to the item of information, prior to transmitting the message.

3. The method of claim 2, wherein modifying the DNS record includes modifying at least the time-to-live.

4. The method of claim 2, wherein modifying the DNS record includes modifying at least the second identifier.

5. The method of claim 1, further comprising receiving a request for subscription to updates of the DNS record, from the application server.

6. The method of claim 1, further comprising a prior transmission of a request for subscription to updates of the DNS record, to the authoritative server.

7. The method of claim 1, wherein the second identifier is the result of a selection of a subset from a set of second identifiers associated with the first identifier in the DNS record obtained.

8. A resolver server capable of receiving and of transmitting an identifier resolution request for a resource on a network, the resolver server comprising an optimization device configured to optimizing a refresh rate of at least a part of a DNS record comprising an association between a first identifier of a resource on a network and a second identifier of the resource, and a time-to-live for the association, the resolver server having obtained the DNS record from an authoritative server in advance of an access to the resource by a terminal connected to an application server referencing the first identifier, the optimization device comprising:
a transmitter capable of transmitting, to the application server, a message comprising a change of the DNS record of the first identifier referenced by the application server.

9. A system for optimizing the refresh rate of at least a part of a DNS record comprising an association between a first identifier of a resource on a network and a second identifier of the resource, and a time-to-live for the association, the system comprising:
the resolver server of claim 8; and
an application server referencing the first identifier included in the DNS record, the application server configured to:
receive from the resolver server a message comprising at least the association a change in the DNS record, and
transmit the message to a user terminal capable of transmitting an identifier resolution request for a resource on a network to the resolver server.

10. A non-transitory computer-readable medium having stored thereon instructions, which when executed by a processor, cause the processor to implement the method of claim 1.

\* \* \* \* \*